US006728023B1

(12) United States Patent
Alioshin et al.

(10) Patent No.: US 6,728,023 B1
(45) Date of Patent: Apr. 27, 2004

(54) OPTICAL DEVICE ARRAYS WITH OPTIMIZED IMAGE RESOLUTION

(75) Inventors: Paul Alioshin, San Francisco, CA (US); Dave B. Corbin, Los Altos, CA (US); Akira Tomita, Redwood City, CA (US); Robert W. Corrigan, Sisters, OR (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 10/161,193

(22) Filed: May 28, 2002

(51) Int. Cl.[7] .................. G02B 26/00; G02B 26/08; G02F 1/29; G02F 1/1347

(52) U.S. Cl. .................. 359/290; 359/291; 359/298; 349/74

(58) Field of Search .................. 359/290, 291, 359/298, 214, 224, 223, 849, 850; 349/73, 74

(56) References Cited

U.S. PATENT DOCUMENTS

| | | |
|---|---|---|
| 1,525,550 A | 2/1925 | Jenkins |
| 1,548,262 A | 8/1925 | Freedman |
| 1,814,701 A | 7/1931 | Ives |
| 2,415,226 A | 2/1947 | Sziklai ............. 178/5.4 |
| 2,783,406 A | 2/1957 | Vanderhooft .......... 313/70 |
| 2,920,529 A | 1/1960 | Blythe ............. 88/73 |
| 2,991,690 A | 7/1961 | Grey et al. .......... 88/16.6 |
| 3,256,465 A | 6/1966 | Weissenstern et al. ...... 317/101 |
| 3,388,301 A | 6/1968 | James ............. 317/234 |
| 3,443,871 A | 5/1969 | Chitayat ............. 356/106 |
| 3,553,364 A | 1/1971 | Lee ............. 178/7.3 |
| 3,576,394 A | 4/1971 | Lee ............. 178/7.3 |
| 3,600,798 A | 8/1971 | Lee ............. 29/592 |
| 3,656,837 A | 4/1972 | Sandbank ............. 350/161 |
| 3,657,610 A | 4/1972 | Yamamoto et al. ...... 317/243 |
| 3,693,239 A | 9/1972 | Dix ............. 29/470 |
| 3,743,507 A | 7/1973 | Ih et al. ............. 96/81 |

(List continued on next page.)

FOREIGN PATENT DOCUMENTS

| | | | |
|---|---|---|---|
| EP | 0 322 714 A2 | 7/1989 | ............. G02B/5/30 |

OTHER PUBLICATIONS

Apte et al., "Deformable Grating Light Valves for High Resolution Displays," Solid State Actuator Workshop, Hilton Head, South Carolina, Jun. 13–16, 1994.
Sene et al., "Polysilicon micromechanical gratings for optical modulation," Sensors and Actuators, vol. A57, pp. 145–151, 1996.
Amm et al., "Invited Paper: Grating Light Valve™ Technology: Update and Novel Applications," SID Digest, vol. 29, 1998.
"Micromachined Opto/Electro/Mechanical Systems," Electronic Systems, NASA Tech Briefs, Mar. 1997, pp. 50 & 52.
David M. Burns et al., "Development of Microelectromechanical Variable Blaze Gratings," Sensors and Actuators A 64 (1998), pp. 7–15.

*Primary Examiner*—Georgia Epps
*Assistant Examiner*—William Choi
(74) *Attorney, Agent, or Firm*—Haverstock & Owens LLP (57) ABSTRACT

Optical devices comprising addressable pixels are tiled in an array configured for generating an image line. The addressable pixels are grouped into center pixels and addressable sub-pixels are grouped at the ends. The optical devices are tiled in staggered rows with addressable. sub-pixels and/or pixels overlapping along the array. To optimize the quality of the image, addressable sub-pixels are selectively operated and/or disabled to remove artifacts and maximize pixel density in the image line generated by the overlap regions. Arrays of optical devices, in accordance with the invention, are used generate image lines for display and print applications. The optical devices can be any light valve including MEM devices such as diffraction grating light valves and LCD devices.

20 Claims, 8 Drawing Sheets

U.S. PATENT DOCUMENTS

| | | | |
|---|---|---|---|
| 3,752,563 A | 8/1973 | Torok et al. | 359/280 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 359/573 |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 345/7 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 359/305 |
| 3,941,456 A | 3/1976 | Schilz et al. | 359/305 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 359/245 |
| 4,006,968 A | 2/1977 | Ernstoff et al. | 349/105 |
| 4,009,939 A | 3/1977 | Okano | 359/589 |
| 4,011,009 A | 3/1977 | Lama et al. | 359/571 |
| 4,012,116 A | 3/1977 | Yevick | 359/465 |
| 4,012,835 A | 3/1977 | Wallick | 29/591 |
| 4,017,158 A | 4/1977 | Booth | 359/567 |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 348/292 |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 359/227 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 359/239 |
| 4,143,943 A | 3/1979 | Rawson | 359/446 |
| 4,163,570 A | 8/1979 | Greenaway | 283/8 A |
| 4,184,700 A | 1/1980 | Greenaway | 283/6 |
| 4,185,891 A | 1/1980 | Kaestner | 372/9 |
| 4,190,855 A | 2/1980 | Inoue | 357/80 |
| 4,195,915 A | 4/1980 | Lichty et al. | 349/11 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/112 |
| 4,225,913 A | 9/1980 | Bray | 363/97 |
| 4,249,796 A | 2/1981 | Sincerbox et al. | 359/241 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 359/286 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 359/569 |
| 4,331,972 A | 5/1982 | Rajchman | 358/60 |
| 4,336,982 A | 6/1982 | Rector, Jr. | 359/285 |
| 4,338,660 A | 7/1982 | Kelley et al. | 364/200 |
| 4,343,535 A | 8/1982 | Bleha, Jr. | 349/9 |
| 4,346,965 A | 8/1982 | Sprague et al. | 359/285 |
| 4,348,079 A | 9/1982 | Johnson | 359/285 |
| 4,355,463 A | 10/1982 | Burns | 29/827 |
| 4,361,384 A | 11/1982 | Bosserman | 359/630 |
| 4,369,524 A | 1/1983 | Rawson et al. | 455/606 |
| 4,374,397 A | 2/1983 | Mir | 358/75 |
| 4,389,096 A | 6/1983 | Hori et al. | 349/5 |
| 4,391,490 A | 7/1983 | Hartke | 359/263 |
| 4,396,246 A | 8/1983 | Holman | 385/10 |
| 4,398,798 A | 8/1983 | Krawczak et al. | 359/573 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 359/573 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 359/286 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 359/247 |
| 4,484,188 A | 11/1984 | Ott | 340/728 |
| 4,487,677 A | 12/1984 | Murphy | 204/247 |
| 4,492,435 A | 1/1985 | Banton et al. | 359/295 |
| 4,503,494 A | 3/1985 | Hamilton et al. | 364/200 |
| 4,511,220 A | 4/1985 | Scully | 359/495 |
| 4,538,883 A | 9/1985 | Sprague et al. | 359/263 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 359/305 |
| 4,577,933 A | 3/1986 | Yip et al. | 359/216 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 349/15 |
| 4,636,039 A | 1/1987 | Turner | 359/245 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 359/9 |
| 4,660,938 A | 4/1987 | Kazan | 359/245 |
| 4,661,828 A | 4/1987 | Miller, Jr. et al. | 346/108 |
| 4,662,746 A | 5/1987 | Hornbeck | 359/223 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 385/24 |

| Patent | Date | Inventor | Class |
|---|---|---|---|
| 4,709,995 A | 12/1987 | Kuribayashi et al. | 345/89 |
| 4,710,732 A | 12/1987 | Hornbeck | 332/7.51 |
| 4,711,526 A | 12/1987 | Hennings et al. | 359/629 |
| 4,714,326 A | 12/1987 | Usui et al. | 359/222 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 349/5 |
| 4,724,467 A | 2/1988 | Yip et al. | 355/71 |
| 4,728,185 A | 3/1988 | Thomas | 353/122 |
| 4,743,091 A | 5/1988 | Gelbart | 369/112.24 |
| 4,744,633 A | 5/1988 | Sheiman | 359/465 |
| 4,747,671 A | 5/1988 | Takahashi et al. | 349/85 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 385/33 |
| 4,765,865 A | 8/1988 | Gealer et al. | 156/647 |
| 4,772,094 A | 9/1988 | Sheiman | 359/466 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 359/259 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 359/464 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 385/24 |
| 4,827,391 A | 5/1989 | Sills | 363/41 |
| 4,829,365 A | 5/1989 | Eichenlaub | 358/3 |
| 4,856,863 A | 8/1989 | Sampsell et al. | 385/4 |
| 4,856,869 A | 8/1989 | Sakata et al. | 349/201 |
| 4,859,012 A | 8/1989 | Cohn | 385/17 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 359/245 |
| 4,897,708 A | 1/1990 | Clements | 357/65 |
| 4,902,083 A | 2/1990 | Wells | 359/214 |
| 4,915,463 A | 4/1990 | Barbee, Jr. | 359/360 |
| 4,915,479 A | 4/1990 | Clarke | 349/62 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 359/214 |
| 4,940,309 A | 7/1990 | Baum | 359/618 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 359/254 |
| 4,970,575 A | 11/1990 | Soga et al. | 357/72 |
| 4,978,202 A | 12/1990 | Yang | 349/15 |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 359/214 |
| 5,013,141 A | 5/1991 | Sakata | 349/201 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 359/1 |
| 5,028,939 A | 7/1991 | Hornbeck et al. | 346/160 |
| 5,035,473 A | 7/1991 | Kuwayama et al. | 359/13 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunnaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |

| Patent No. | Date | Inventor | Class |
|---|---|---|---|
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| 5,202,785 A | 4/1993 | Nelson | 359/214 |
| 5,206,629 A | 4/1993 | DeMond et al. | 340/719 |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| 5,226,099 A | 7/1993 | Mignardi et al. | 385/19 |
| 5,229,597 A * | 7/1993 | Fukatsu | 250/208.2 |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,311,360 A | 5/1994 | Bloom et al. | 359/572 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A * | 5/1994 | Abramov | 359/224 |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | D'Hont et al. | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,371,543 A | 12/1994 | Anderson | 348/270 |
| 5,371,618 A | 12/1994 | Tai et al. | 359/53 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |

| Patent No. | Date | Inventor | Class |
|---|---|---|---|
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Green et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/291 |

| Patent No. | Date | Inventor | Class |
|---|---|---|---|
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,088,102 A | 7/2000 | Manhart | 356/354 |
| 6,090,717 A | 7/2000 | Powell et al. | 438/710 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,797 B1 | 1/2001 | Huibers | 359/291 |
| 6,177,980 B1 | 1/2001 | Johnson | 355/67 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansoon | 361/233 |
| 6,241,143 B1 | 6/2001 | Kuroda | 228/110.1 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,323,984 B1 | 11/2001 | Trisnadi | 359/245 |
| 6,342,960 B1 | 1/2002 | McCullough | 359/124 |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,445,502 B1 | 9/2002 | Islam et al. | 359/571 |
| 6,452,260 B1 | 9/2002 | Corbin et al. | 257/686 |
| 6,466,354 B1 | 10/2002 | Gudeman | 359/247 |
| 6,497,490 B1 | 12/2002 | Miller et al. | 359/614 |
| 6,504,644 B1 * | 1/2003 | Sandstrom | 359/291 |
| 6,525,863 B1 | 2/2003 | Riza | 359/290 |
| 6,563,974 B2 | 5/2003 | A. Riza | 385/18 |
| 2001/0019454 A1 | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131230 A1 | 9/2002 | Potter | 361/277 |

* cited by examiner

OPTICAL DEVICE ARRAYS WITH OPTIMIZED IMAGE RESOLUTION

FIELD OF THE INVENTION

The present invention relates to the field of optical devices. More particularly, the present invention relates to tiling a plurality of arrays of optical devices configured for imaging with higher resolution than provided by a single array.

BACKGROUND OF THE INVENTION

Print and display resolution has become a critical parameter in the design of imaging systems. From paper print, photo print and display, industries are demanding higher and higher resolutions for a wide range of imaging applications. Besides the higher resolution, there is also a demand for reproducing images with minimal artifacts, distortions and/or other defects.

One solution for the demand of high fidelity and high resolution print and display imaging has been to use imaging systems capable of generating images with a greater number of smaller pixels. In certain applications, pixels are configured as a linear, or substantially linear, arrays of pixels for generating an image line on a display unit or print medium.

Optical MEM (micro-electro-mechanical) devices are useful in imaging technologies. Examples of optical MEM devices that can be used in imaging technologies are disclosed in the U.S. Pat. Nos. 5,311,360, 5,841,579 and 5,808,797, all issued to Bloom et al., the contents of which are hereby incorporated by reference.

Briefly, optical MEM devices described in the above referenced patents have one or more sets of movable ribbons that comprise a support layer and a reflective top-layer. The support layer is preferably a silicon nitride layer and the reflective top-layer is preferably an aluminum layer. The ribbons are coupled to a substrate at opposite ends of the ribbons, whereby center portions of the ribbons (active portions) move up and down to modulate an incident light source. Imaging with the aforementioned optical MEM devices offers the capability of generating high contrast, high resolution images efficiently within a compact circuit package. In certain applications, each pixel within an image is formed with three or more sets of ribbon pairs.

What is desired is a method of making an array of optical MEM devices for imaging which is capable of generating image lines with high resolution while minimizing artifacts, distortions, and/or other defects.

SUMMARY OF THE INVENTION

Embodiments of the invention are directed to optical devices, arrays of optical devices and related methods. In accordance with the embodiments of the invention, an optical device preferably comprises an array of addressable optical MEM devices having ribbon pairs for modulating a light source. The array of ribbon pairs are grouped into a center group and end groups. The center group has sets of ribbon pairs, such as three ribbon pairs per set, that are collectively addressed to image pixels. The end groups have fractional sets of ribbon pairs, such as one pair of ribbons per set, that are addressed to image sub-pixels. The optical MEM device preferably comprises bond pads corresponding to each set and fractional set of ribbon pairs for coupling to a driver circuit. It will be apparent to those of ordinary skill in the art that optical devices other than MEM devices can be used including arrays of liquid crystal display (LCD) pixels. In such a case, a sub-pixel of an LCD would be formed of a separately addressable LCD device which is reduced in size relative to an LCD pixel. The present invention can be implemented using an LCD formed using any conventional LCD technology.

The ribbons are preferably elongated ribbons formed from silicon-based materials, such as silicon-nitride, silicon-oxide and combinations thereof. The ribbons preferably have layers of reflective material, such as aluminum, for reflecting light from the top surfaces of the ribbons. The ribbons can have any dimension suitable for the applications at hand, but preferably have lengths in a range of about 50 to about 500 microns and widths in a range of about 4.0 to about 40 microns and are capable of modulating light having at least one wavelength in a range of about 300 to about 3000 nanometers.

An apparatus, in accordance with embodiments of the invention, comprises one or more linear arrays of optical MEM devices for generating pixels in an image line. The array comprises a first row of optical MEM devices and a second row of optical MEM devices that are tiled in a staggered configuration with respect to the first row, such that end groups of ribbons, as described above, form overlap regions for generating pixels in the image line. In accordance with further embodiments, the apparatus comprises a third row of optical MEM devices staggered relative to the first row and/or second row. In yet further embodiments, the apparatus comprises a display means, such as a screen or a monitor for displaying image lines and/or a print means for printing image lines onto a suitable print medium.

In accordance with the method of the invention, optical MEM devices configured for generating pixels and end sub-pixels are tiled (arranged) in an array, with the ends forming overlap regions, as described above. A test image is generated from the array and selected end sub-pixels, or sub-pixels and pixels, are disabled or suppressed to optimize the image quality and/or tailor the image quality for the intended application. Preferably, selected sub-pixels are disabled to remove artifacts and defects and to maximize pixel density of the image line corresponding to the overlap regions.

DETAILED DESCRIPTION OF THE EMBODIMENTS

In a preferred embodiment of the present invention, optical MEM devices are used to modulate one or more wavelengths of light. The optical MEM device preferably comprises an array of ribbon structures to modulate light, such as those disclosed in the U.S. Pat. Nos. 5,311,360, 5,841,579 and 5,808,797, and referenced previously. However, any number of different optical devices or light modulator devices, such as LCD-based light modulators, which can be tiled and fractionated in the manner described below are considered to be within the scope of the invention. It will be apparent to those of ordinary skill in the art that optical devices other than MEM devices can be used including LCD arrays. Where the invention is implemented using LCD technology, an LCD pixel is formed of a pixel sized LCD device. The size of the pixel could be that of a display or of a size that is optically manipulated to form a pixel. A sub-pixel of an LCD would be formed of a separately addressable LCD device which is reduced in size relative to an LCD pixel. The reduction in size of an LCD sub-pixel is relative to the degree of variability required for tiling according the specific implementation. The present invention can be implemented using an LCD formed using any conventional LCD technology. While the following discussion is made relative to the preferred optical MEM device, it will be apparent after reading this disclosure that other light modulators can be substituted.

An array of optical MEM devices can be fabricated on a single chip. However, the circuit requirements to minimize the number of bonding pads in such an integrated process is both costly and complex. Alternatively, an array of optical MEM devices can be tiled, or arranged, on a wafer or substrate that is configured to support and secure the optical MEM devices. The optical MEM devices are preferably tiled in a high density configuration to maximize the pixel density of an image line generated therefrom. Unfortunately, there are limitations to tiling processes and there are manufacturing tolerances associated with the fabrication of the optical MEM devices themselves, which can both lead of imaging artifacts and defects, as described below.

Figure 1:
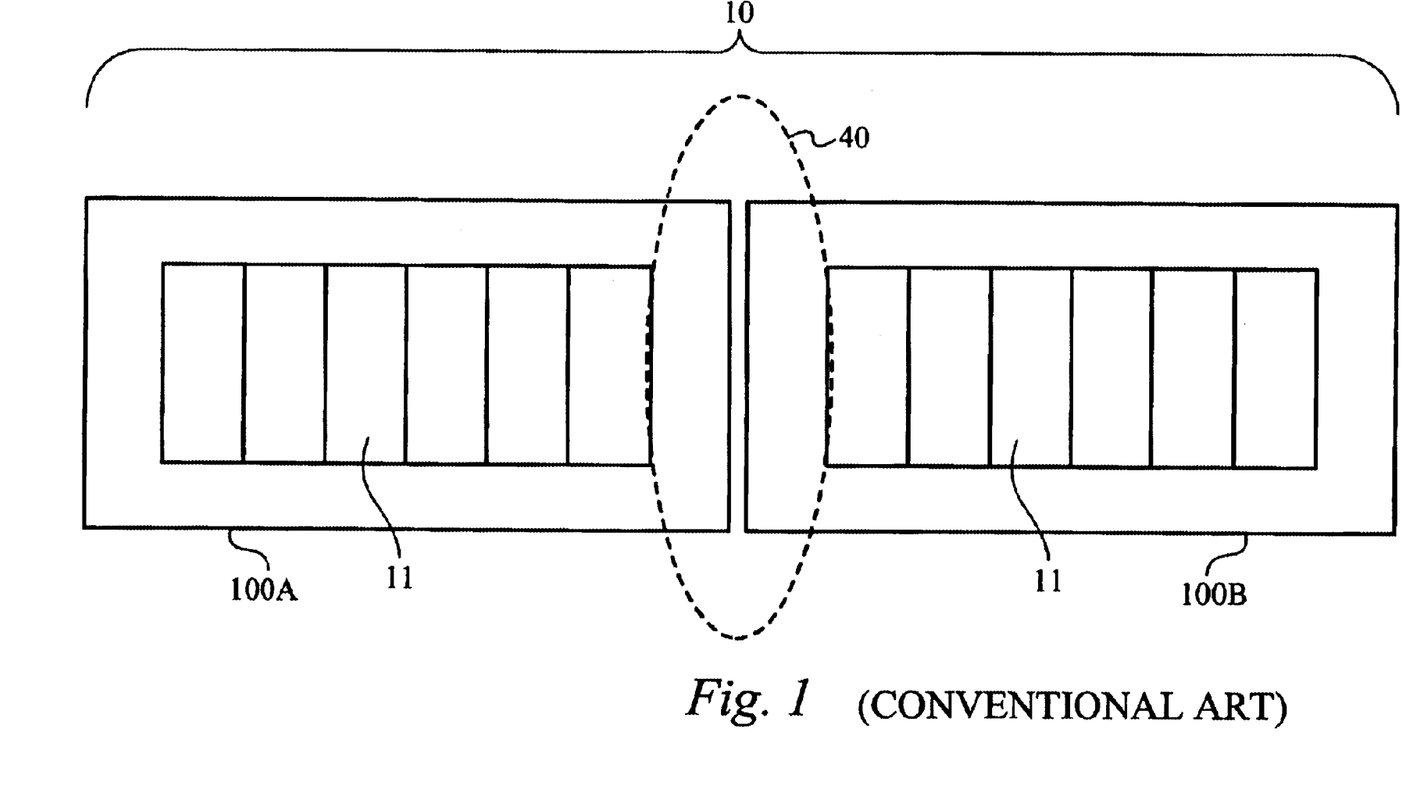
FIG. 1 illustrates a schematic top-view of optical MEM devices tiled in an end-to-end configuration.

FIG. 1 schematic top-view of optical MEM devices 100A and 100B tiled in an end-to-end configuration is to generate an image line. Each block within each optical MEM device 100A and 100B schematically represents a pixel. However, it is understood that each block can represent multiple ribbon pairs that are collectively addressed to image a pixel on the image line.

Still referring to FIG. 1, one shortcoming with placing optical MEM devices 100A and 100B in the end-to-end configuration 10 is that pixels 11 do not extend to the edge of each of the optical MEM devices 100A and 100B, because support structures (not shown) and bonding pads (not shown) occupy the outside area surrounding the optical MEM devices 100A and 100B. Accordingly, a pixel, or pixels are not generated on the image line corresponding to the interface or overlap region 40 resulting in a visible defect (typically a stripe oriented along the scan axis).

Figure 2:
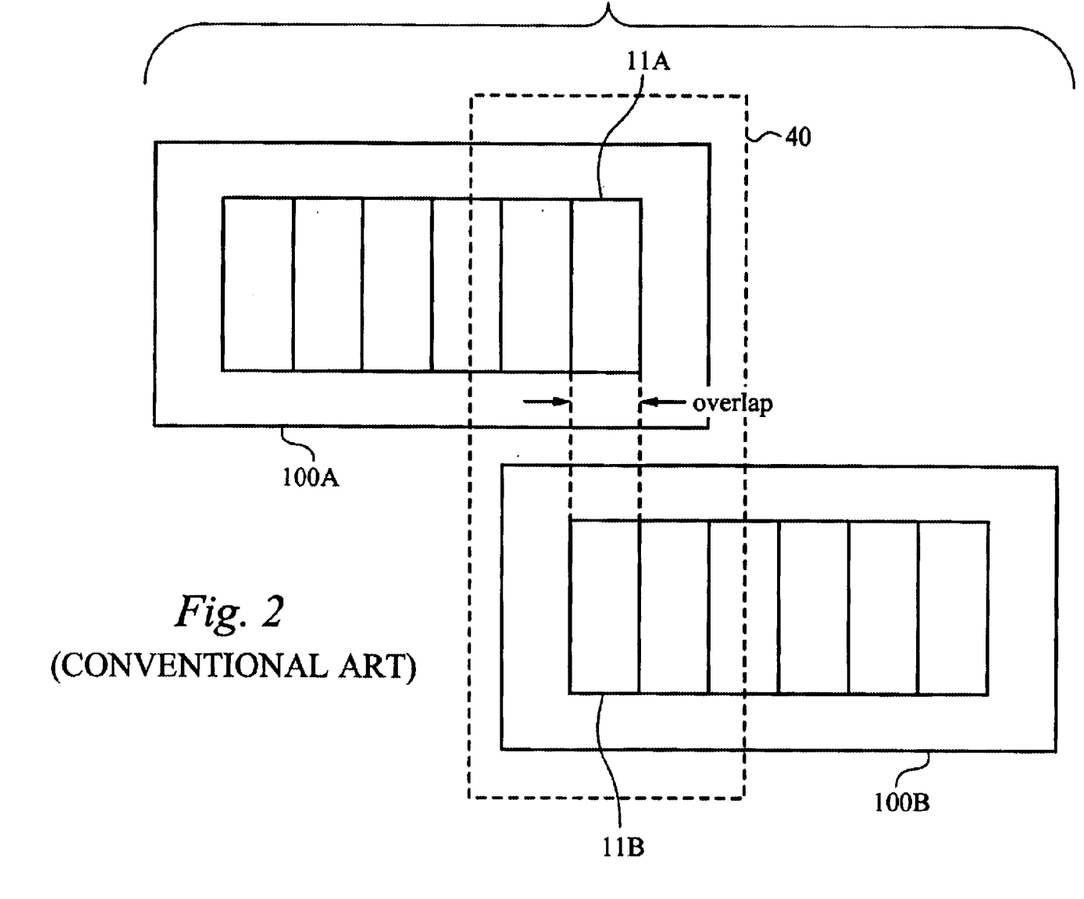
FIG. 2 illustrates a schematic top-view of optical MEM devices tiled in a staggered configuration and forming an overlap region.

FIG. 2 illustrates a schematic top-view optical MEM devices 100A and 100B tiled in a staggered configuration 20 and forming an overlap region 40 for generating an image line. Because the optical MEM devices 100A and 100B are placed in an offset, or staggered configuration, pixels 10 overlap in the overlap region 40.

With the configuration 20 schematically shown in FIG. 2, the overlap region 40 corresponds to the width of a single pixel. Generally, each pixel in this configuration is designed to image a unique location on the image line to maximize the image fidelity and minimize artifacts and distortions. To achieve this condition, one of the pixels 11A or 11B can be disabled or suppressed to avoid having more than one pixel imaged on the image line; a condition which could cause a distortion in the image line. Unfortunately, tiling processes have tolerances that are on the order of a hundred microns or higher. Since the width of a pixel is on the order of a few microns, or less, the ideal alignment of a single end pixel, such as shown in FIG. 2, can not be consistently be achieved.

Figure 3:
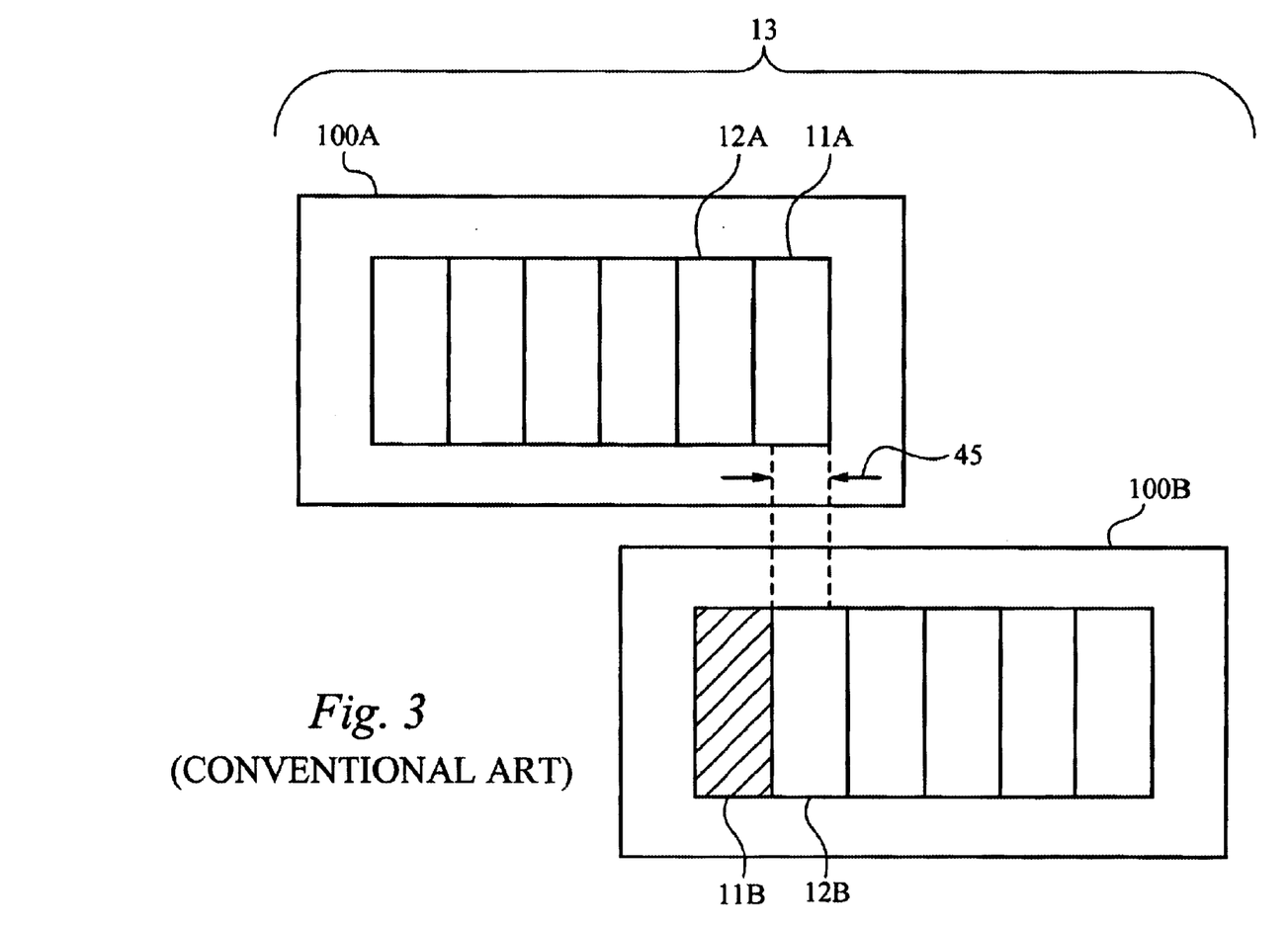
FIG. 3 illustrates artifacts that can occur in an array of optical MEM devices tiled in a staggered configuration, as shown in FIG. 2.

FIG. 3 schematically shows a pixel alignment which can result from tiling the optical MEM devices 100A and 100B in a staggered configuration 13 using current tiling methods. The pixels 11B and 12B both overlap with portions of pixel 11A. Under these circumstances, the pixel 11B can be disabled to avoid multiple pixels imaging the identical location of the image line. However, pixel 12B and pixel 11A both remain active to avoid a blank region on the image line, a distortion of the image line which is unacceptable for high resolution imaging applications.

Figure 4:
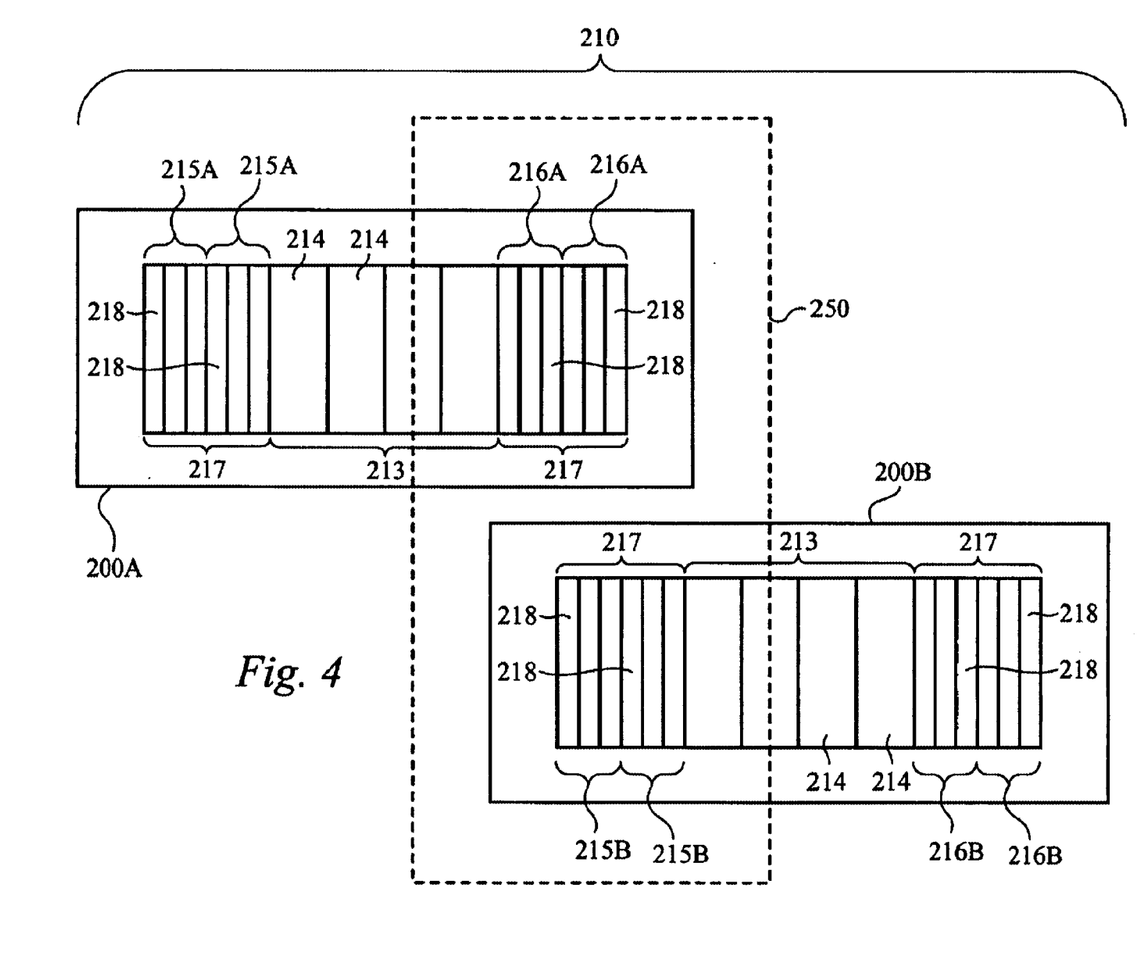
FIG. 4 illustrates a schematic top-view of optical MEM devices tiled in a staggered configuration with center pixels and end sub-pixels, in accordance with the invention.

FIG. 4 illustrates a schematic top-view of optical MEM device 200A and 200B tiled in a staggered configuration 210, in accordance with the invention. For simplicity purposes, only two optical MEM devices are shown. However, arrays comprising any number of staggered optical MEM devices are considered to be within the scope of the invention. Each of the optical MEM devices 200A and 200B includes a plurality of ribbon pairs. Preferably, the ribbon pairs are arranged as a linear array, or substantially linear array for generating pixels on an image line. The optical MEM devices 200A and 200B preferably have an equal numbers of pixels and/or ribbons, or alternatively have different numbers of pixels and/or ribbons. The preferred number of pixels in each of the optical MEM devices 200A and 200B is determined by the intended application and the desired resolution.

Still referring to FIG. 4, the optical MEM devices 200A and 200B include central groups 213 of center pixels 214, and end groups 217 of end pixels 215A, 215B, 216A and 216B. The optical MEM devices 200A and 200B are arranged in a staggered configuration such that end pixels 215A and 216B are at opposite ends of the array 210 and the end pixels 215B and 216A at least partially overlap in the overlap region 250. The end pixels 215A, 215B, 216A and 216B are divided into sub-pixels 218, each comprising one or more ribbon pairs. The sub-pixels 218 are configured to be individually addressed to optimize the image generated in the overlap region 250 of the array configuration 210, as explained below. Accordingly, the optical MEM devices 200A and 200B require bonding pads for each center pixel 214 and each sub-pixel 218, wherein individually controlled driver signals can be applied to selected ribbon corresponding to each center pixel 214 and each sub-pixel 218.

FIG. 4 illustrates the end pixels 215A, 215B, 216A and 216B being divided into three sub-pixels 218. However, the end pixels 215A, 215B, 216A and 216B can be divided into any number sub-pixels depending on the application at hand and the desired resolution. Preferably, however, the end-pixels 215A, 215B, 216A and 216B are divided into fractional sub-pixels, wherein a selected number of sub pixels represent one center pixel 214.

Figure 8:
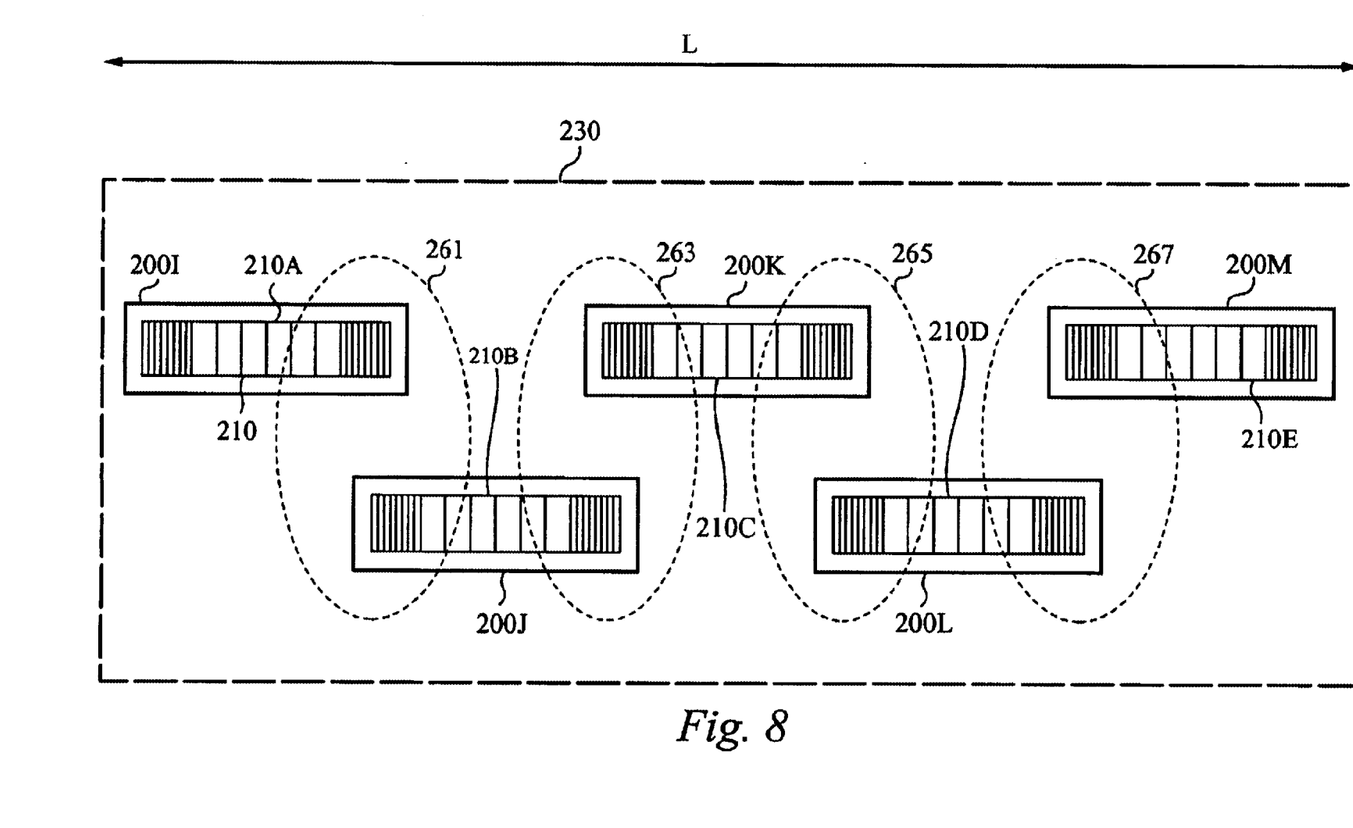
FIG. 8 illustrates a schematic top-view of an array of optical MEM devices tiled in accordance with the invention.

As illustrated in FIG. 4, the optical MEM devices 200A and 200B are tiled into the array configuration 210 with an overlap region 250 which is dependent on manufacturing processes and tolerances. Accordingly, the overlap region 250 will vary from array to array and between adjacent optical MEM devices in an extended array configuration 250, such as shown in FIG. 8. As described below, sub-pixels 218 and pixels can be selectively controlled and/or suppressed to minimize artifacts and defects of the image line While FIG. 4 shows a single overlap region 250 the invention is particularly useful for optimizing the image quality generated from an extended linear array of densely tiled optical MEM devices, wherein the optical MEM devices are tiled in staggered rows. Also, the principles and applications of the invention can be readily extended larger two dimensional arrays of optical MEM devices.

Embodiments of the invention allow for optical MEM device arrays capable of generating high resolution image lines and which can be tailored to the specific imaging demands of a specific application. High resolution staggered arrays of optical MEM devices can generate image lines with resolution that approaches the sum of the resolutions afforded by each of the optical MEM devices 200A and 200B. For example, if each of the optical MEM devices 200A and 200B image 1000 pixels, the array 210 can image nearly 2000 pixels. In accordance with embodiments of the invention, variations in the overlap regions between optical MEM device tiled in staggered rows are compensated, adjusted or modified by selectively disabling selected sub-pixels and/or sub-pixels and pixels to minimize artifacts and defects in the overlap regions. Further, by selectively operating pixels and/or suppressing sub-pixels 218 and/or center pixels 214, the image quality can be optimized, as described below.

With a staggered array of optical MEM devices, selective pixel and/or sub-pixel addressing can be used to compensate for a distribution of pixels generated from an extended array 230 of an optical MEM device tiled in a first row and a second row, such as shown in FIG. 8. Selective addressing of pixels and/or sub-pixels can be done, for example, with selective timing adjustments of driver signals applied to the ribbons. Alternately, or in addition to timing adjustments of driver signals, optics can be used to correct for the fact that a single image line is being generated from two or more rows in the optical array. For example, a first optical system can be implemented for imaging pixels from the first row while a second optical system can be implemented for imaging pixels from the second row, wherein each optical system makes the necessary optical changes to compensate for pixels being generated from two or more rows in the extended optical array 230.

Figure 5:
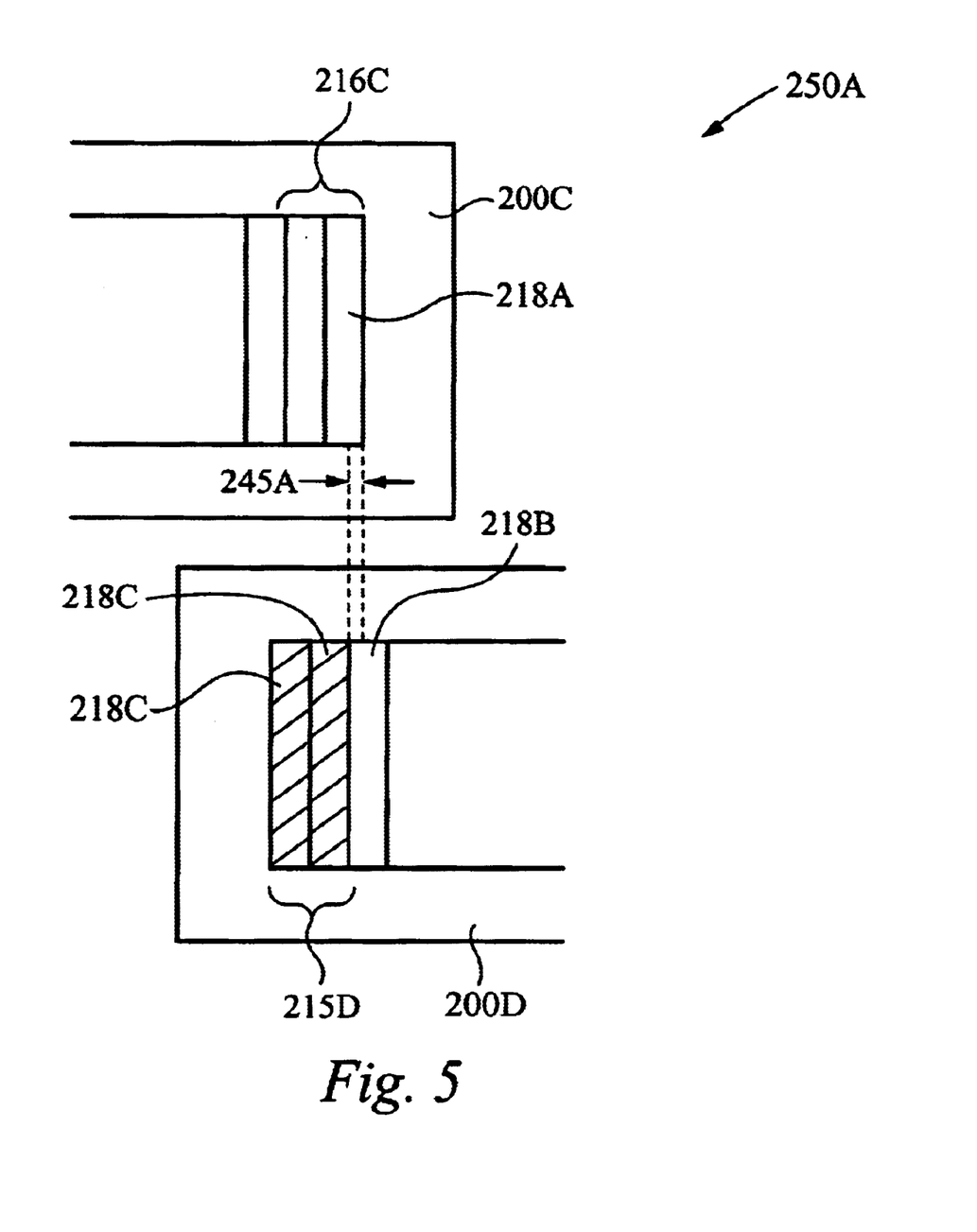
FIG. 5 illustrates a schematic top-view of a overlap region modified in accordance with the invention.

FIG. 5 illustrates an overlap region 250A after the overlap region has been arrangement modified to improve the image quality. Here, the overlap region 250A includes a first end pixel 216C and a second end pixel 215D. The driver signals to the sub-pixels 218C are suppressed so that these sub-pixels 218C do not contribute the image formed in the overlap region 250A, while the sub-pixels 218A and 218B remain active. There will still be distortion in the overlap region 250A due to the fraction of the sub-pixel 245A generated by both the sub-pixel 218A and the sub-pixel 218B. However, the distortion in the overlap region 250A is minimized relative to the distortions that can result from the configuration 13 shown in FIG. 3.

Figure 6:
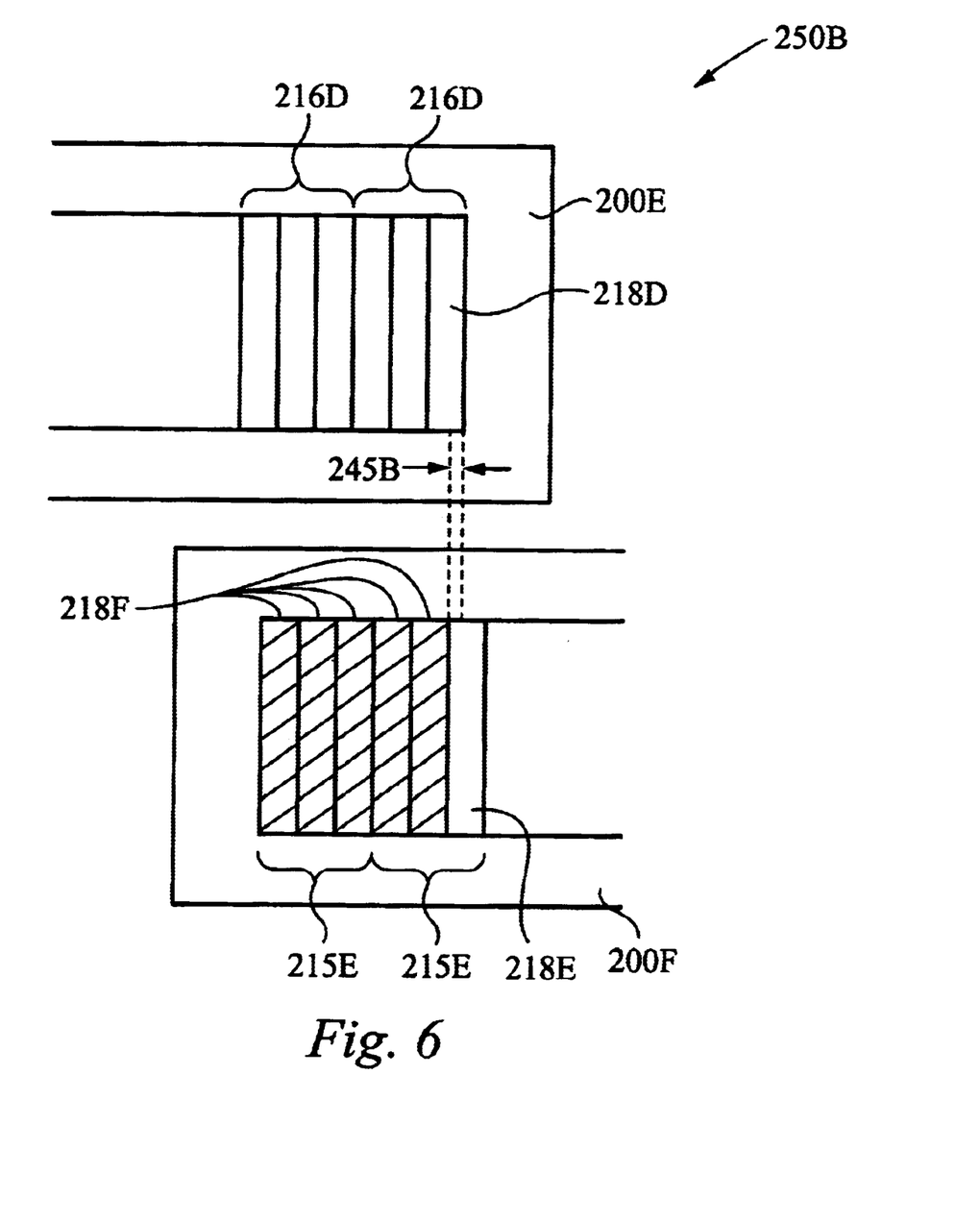
FIG. 6 illustrates a schematic top-view of a overlap region modified in accordance with alternative embodiments of invention.

FIG. 6 illustrates a schematic top-view of an overlap region 250B modified in accordance with an alternative embodiment of the invention. In this example, the overlap region 250B comprises two end pixels 216D from the device 200E and two end-pixels 215E from the device 200F. Driver signals are suppressed to the sub-pixels 218E, such that the sub-pixels 218F do not contribute to the image formed by the overlap region 250B. There will be distortion in the overlap lap region 250B due to the fraction of the sub-pixel 245B generated by both the sub pixel 218D and the sub-pixel 218E. However, the distorting in the overlap region 245B is minimized relative the distortions that can result from configuration 13 shown in FIG. 3.

Figure 7:
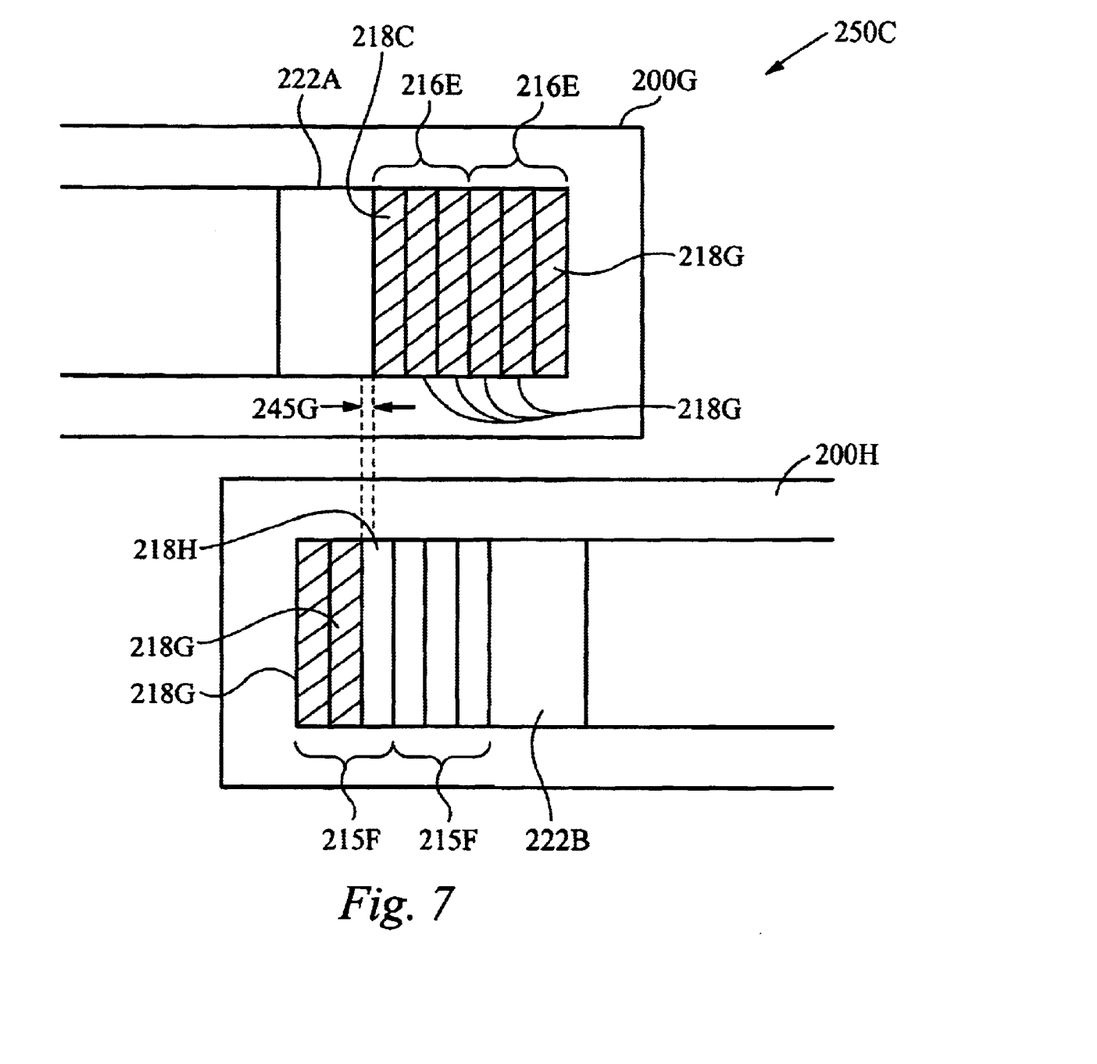
FIG. 7 illustrates a schematic top-view of an overlap region modified in accordance with further embodiments of the invention.

FIG. 7 illustrates a schematic top-view of an overlap region 250C modified in accordance with further embodiments of the invention. In this example, the overlap region 250C comprises two end pixels 216E from the device 200G and two end-pixels 215F from the device 200H. The overlap region 250C also includes a portion of a center pixel 222A from the device 200G. To optimize the image formed by the overlap region 250C, the driver signals to all of the sub-pixels 218G are disabled, such that the sub-pixels 218G do not contribute to the image formed by the overlap region 250C. Again, there is some distortion in the overlap region 250C due to the fraction of the image 245C generated by both the sub-pixel 218H and the center pixel 222A. However, the distorting in the overlap region 250C is minimized relative to the distortions that can result from the configuration 13 shown in FIG. 3.

The selection of which driver signal to suppress and/or which pixels and sub-pixels to suppress can be judiciously made using any number of methods including physical inspection of a test image generated by an array. Other methods include computer enhanced methods, whereby images generated by a first row of optical MEM devices, a second row of optical MEM devices and the array of optical MEM devices comprising the first and the second rows, are captured and analyzed to identify the location of defects. Any number of image analysis methods and image manipulation techniques as applied to staggered array of optical MEM devices, are considered to be within the scope of the invention.

FIG. 8 illustrates a schematic top-view of an array of optical MEM devices 200I, 200J, 200K, 200L and 200M that are tiled in a staggered configuration 230 for generating an image line, in accordance with the invention. Each of the optical MEM devices 200L 200J, 200K, 200L and 200M comprise a liner arrangement of ribbon structures elongated in a direction that is substantially perpendicular to the length L of the array 230. The optical MEM devices 200I, 200J, 200K, 200L and 200M overlap to form the overlap regions 261, 263, 265 and 267. The overlap regions 261, 263, 265 and 267 comprise end pixels device into sub-pixels and/or center pixels, as described above. The array configuration 230 can be extend to have any number of optical MEM devices suitable for the application at hand.

An imaging apparatus in accordance with embodiments of the invention comprises a light source for generating light having one or more wavelengths in a range of about 300 to about 3000 nanometers and suitable optics for generated image lines from the array of optical MEM devices. The imaging apparatus can also include a display unit, such a monitor and screen for displaying the image lines generated from the array of optical MEM devices. In yet further embodiments, an imaging apparatus comprises printer for printing image lines generated from the array of optical MEM devices onto a suitable print medium. The present invention has been described in terms of specific embodiments incorporating details to facilitate the understanding of the principles, the construction and the operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention. In particular, eliminating the sub-pixels which are not part of an overlap region and which are located at opposite ends of an array of optical MEM devices is within the scope of the present invention. Further, tiling arrays of optical MEM devices in more than two rows is also contemplated.

What is claimed is:

1. A light modulator comprising an array of pixels, the array comprising a center group, a first end group and a second end group, wherein the center group comprises a plurality of pixels and wherein the first end group and the second end group comprise fractional pixels configured to image sub-pixels.

2. The light modulator of claim 1, further comprising driver circuits corresponding to each of the pixels and each of the sub-pixels.

3. The light modulator of claim 2, wherein each sub-pixel comprises ribbon pairs and each pixel comprises sets of ribbon pairs.

4. The light modulator of claim 3, wherein alternating ribbons from the ribbon pairs are addressable to image the pixels and the sub-pixels.

5. The light modulator of claim 3, wherein the array of ribbons comprise silicon nitride with a reflective aluminum layer for modulating reflected light.

6. The light modulator of claim 2, wherein each pixel comprises an LCD pixel and each sub-pixel comprises a predetermined fraction of a size of the LCD pixel.

7. An apparatus comprising an array of optical MEM devices for generating pixels in an image line, the linear array of optical MEM devices comprising:
   a. a first row of the optical MEM devices; and
   b. a second row of the optical MEM devices, the first row of optical MEM devices and the second row of optical MEM devices being staggered with a portion of each row forming a first overlapping region, wherein the first and second row of optical MEM devices are configured for imaging sub-pixels in the first overlapping region for optimization pixels in the image line corresponding to the overlapping regions.

8. The apparatus of claim 7, wherein the linear array further comprises a third row of optical MEM devices being staggered with respect to the second row of optical MEM devices, wherein a portion of the second row overlaps a portion of the third row in a second overlapping region and the second and third rows of optical MEM devices are configured for imaging sub-pixels in the second overlapping region.

9. The apparatus of claim 7, wherein each of the optical MEM devices comprises an array of ribbon pairs.

10. The apparatus of claim 9, wherein the array of ribbon pairs comprise a center group, a first end group and a second end group in the first overlapping region, wherein the center group comprises sets of addressable ribbon pairs and wherein the first end group and the second end group comprise fractional sets of addressable ribbon pairs.

11. The apparatus of claim 7, further comprising a driver circuit for driving selected ribbons to image the pixels and the sub-pixels.

12. The apparatus of claim 7, further comprises a display means for displaying the image line.

13. The apparatus of claim 7, further comprising a print means for printing the image line.

14. The apparatus of claim 7, wherein each pixel comprises an LCD pixel and each sub-pixel comprises a predetermined fraction of a sub-pixel.

15. A method comprising:
   a. tiling an array of optical MEM devices in at least two rows with overlapping regions, wherein the optical MEM devices are configured to image pixels and subpixels in overlapping regions;
   b. generating an image from the array of optical MEM devices; and
   c. disabling selected sub-pixels in the overlapping regions to enhance the image.

16. The method of claim 15, wherein the optical MEM devices comprise ribbon pairs elongated perpendicular to the at least two rows.

17. The method of claim 15, wherein generating the image comprises illuminating the ribbons with a light source and selectively moving at least one ribbon in each of the ribbon pairs.

18. The method of claim 16, wherein each image pixel is generated with a number of ribbons collectively addressed and wherein each sub-pixel is generated with a fraction of the number of ribbons.

19. The method of claim 15, wherein generating the image comprises activating a display medium.

20. The method of claim 15, wherein generating the image comprises activating a print medium.

* * * * *